(12) United States Patent
Desai et al.

(10) Patent No.: US 7,353,410 B2
(45) Date of Patent: Apr. 1, 2008

(54) METHOD, SYSTEM AND CALIBRATION TECHNIQUE FOR POWER MEASUREMENT AND MANAGEMENT OVER MULTIPLE TIME FRAMES

(75) Inventors: Dhruv Manmohandas Desai, Cary, NC (US); Nickolas J. Gruendler, Raleigh, NC (US); Carl A. Morrell, Cary, NC (US); Gary R. Shippy, Cary, NC (US); Michael Leo Scollard, Raleigh, NC (US); Michael Joseph Steinmetz, Cary, NC (US); Malcolm Scott Ware, Austin, TX (US); Christopher L. Wood, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 11/032,877

(22) Filed: Jan. 11, 2005

(65) Prior Publication Data

US 2006/0156042 A1    Jul. 13, 2006

(51) Int. Cl.
  *G06F 1/26* (2006.01)
(52) U.S. Cl. .................... 713/300; 702/60; 702/70; 713/340
(58) Field of Classification Search ............... 713/300, 713/340; 702/60, 70
  See application file for complete search history.

(56) References Cited

U.S. PATENT DOCUMENTS 6,795,928 B2 * 9/2004 Bradley et al. ............. 713/320

2006/0294400 A1 * 12/2006 Diefenbaugh et al. ...... 713/300

FOREIGN PATENT DOCUMENTS

EP    1679576 A2 *    7/2006

OTHER PUBLICATIONS

U.S. Appl. No. 10/727,320, Lefurgy.

* cited by examiner

*Primary Examiner*—Chun Cao
*Assistant Examiner*—Albert Wang
(74) *Attorney, Agent, or Firm*—Mitch Harris; Andrew M. Harris; Casimer K. Salys

(57) ABSTRACT

A method and system and calibration technique for power measurement and management over multiple time frames provides responsive power control while meeting global system power consumption and power dissipation limits. Power output of one or more system power supplies is measured and processed to produce power values over multiple differing time frames. The measurements from the differing time frames are used to determine whether or not system power consumption should be adjusted and then one or more devices is power-managed in response to the determination. The determination may compare a set of maximum and/or minimum thresholds to each of the measurements from the differing time frames. A calibration technique uses a precision reference resistor and voltage reference controlled current source to introduce a voltage drop from the input side of a power supply sense resistor calibration is made at the common mode voltage of the power supply output.

1 Claim, 4 Drawing Sheets

METHOD, SYSTEM AND CALIBRATION TECHNIQUE FOR POWER MEASUREMENT AND MANAGEMENT OVER MULTIPLE TIME FRAMES

CROSS-REFERENCE TO RELATED APPLICATIONS

The present application is related to previously-filed co-pending U.S. patent application Ser. No. 10/727,320, filed on Dec. 3, 2003 and entitled "METHOD AND SYSTEM FOR POWER MANAGEMENT INCLUDING LOCAL BOUNDING OF DEVICE GROUP POWER CONSUMPTION", which is assigned to the same assignee. The specification of the above-referenced patent application is incorporated herein by reference.

BACKGROUND OF THE INVENTION

1. Technical Field

The present invention relates generally to power management in processing systems, and more particularly, to a power management scheme that uses multiple time frame power measurements to estimate power consumption changes and control system power consumption.

2. Description of the Related Art

Present-day computing systems include sophisticated power-management schemes for a variety of reasons. For portable computers such as "notebook", "laptop" and other portable units including personal digital assistants (PDAs), the primary power source is battery power. Intelligent power management extends battery life, and therefore the amount of time that a user can operate the system without connecting to a secondary source of power. Power management has also been implemented over "green systems" concerns so that power dissipated within a building is reduced for reasons of energy conservation and heat reduction.

Recently, power management has become a requirement in line power connected systems, particularly high processing power cores and systems because the components and/or systems are now designed with total potential power consumption levels that either exceed power dissipation limits of individual integrated circuits or cabinets, or the total available power supply is not designed to be adequate for operation of all units simultaneously. For example, a multiprocessing system may be designed with multiple sub-systems, but have a power supply system that cannot supply the maximum potential power required by each subsystem simultaneously. In another example, a processor may be designed with multiple execution units that cannot all operate simultaneously due to either an excessive power dissipation level or a problem in distributing the requisite current level throughout the processor without excessive voltage drop. The potential power available from a power supply does not have a single value, but typically is a relationship between power level and time in which greater power is available for shorter intervals up to a maximum power level beyond which the power supply will fail at any power level (either due to protection circuitry or absolute failure such as an over-current in a voltage-regulating device).

Typically, information about changes in power consumption within a system is provided by either a static power measurement determined from current sensing and/or by thermal measurements that relate the accumulation of heat within the system to power consumption. Neither are sufficiently accurate for fine-grained power management schemes. Power management schemes requiring fine-grained power consumption information, such as that disclosed in the above-referenced Patent Application either measure current consumption at a fairly slow rate, or estimate power consumption based on calculations made in conformity with the power savings state of each device in the system. Current measurements lack accuracy in that they do not take into account the instantaneous voltage of the system power supply, which affects the accuracy of any power use calculation. Also, estimations based on device status are only approximations to the actual power consumed by the system. Even at the device level, the approximation is seldom accurate, as estimates of power from device or system load calculations or based on a total of activated sub-units do not accurately reflect the actual power consumption of the system. Further, the typical long term measurements made by the power subsystem are typically provided for control of thermal or current failure conditions and do not provide sufficient information for controlling short term variations in power consumption. Therefore, more power may actually be available in the short term than is actually used, or if the system is operated close to the power margin, short-term behavior may cause the system to exceed desired operating power levels.

Power supply current measurements are also generally inaccurate for the purposes of fine-grained power management. In particular, current measurements made through a small voltage drop introduced at the output of a power supply are typically difficult to calibrate accurately without interrupting the power supplied to the system.

It is therefore desirable to provide a method and system for providing power management within a processing system in response to a more accurate measurement of system and device power consumption that reflects both short term and long term constraints so that system power use may be optimized. It would further be desirable to provide a method and apparatus for calibrating the power measurement without interrupting power to the system.

SUMMARY OF THE INVENTION

The objective of providing power management within a processing system responsive to fine-grained power measurements is provided in a method and system for power measurement and management. The objective of calibrating the measurement without interrupting system power is provided in a method and apparatus for calibrating a power measurement.

The method and system for power management measure power supplied by one or more power supplies over multiple time frames of differing lengths and then adjusting the system power consumption in response to the measurements. The measurements can then be compared to multiple thresholds in order to determine whether or not the system power is exceeding permissible consumption levels for any of the time frames. Alternatively, or in concert, measurements may also be compared to minimum thresholds so that system operation can be optimized when some in-demand devices are being power-managed. The method may be performed at the sub-unit level, by effectively measuring power consumption and bounding it at each device among multiple devices. Alternatively, the measurements may be conducted at the system or device level and communicated to a global power management algorithm that then power-manages the entire system.

The power management hardware and/or software uses each one of a plurality of filters to determine the power supply current and voltage for each time frame and may be implemented by an A/D converter and filtering algorithms. The A/D converter is preceded by an anti-aliasing filter to improve accuracy of the measurements by removing frequency information greater than the Nyquist rate from the power supply voltage and current measurements.

The calibration of the voltage measurement(s) is accomplished by measuring a precision voltage source. The calibration of the current measurement(s) is accomplished by generating a known voltage drop via a precision reference resistor and a precision current source controlled by the precision voltage source. The voltage drop is generated from the input node of the power supply sense resistor as is the current measurement voltage drop, so that the current calibration measurement is made differentially across the reference resistor while the actual current measurement is made differentially across the power supply sense resistor. The same anti-aliasing filters and A/D converters are used in the calibration process, so that any non-linearity and offset in the system at the common mode voltage are taken into account. The resulting measurements thus have the same common mode voltage at the sense resistor input node and can have a common mode voltage matched for precision at the second measurement node by selecting the current source and reference resistor appropriately.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention concerns a technique for power management that relies on power supply current and voltage measurements to accurately measure power consumption of individual devices or an entire system and adjust power management settings up and/or down in conformity with the measurements. A novel measurement scheme provides power consumption information over multiple time scales by filtering (e.g., integrating) the current and voltage waveforms over multiple differing predetermined periods. The multiple time scale measurements provide for optimum use of available power and avoidance of power supply overload conditions for each time frame.

Figure 1:
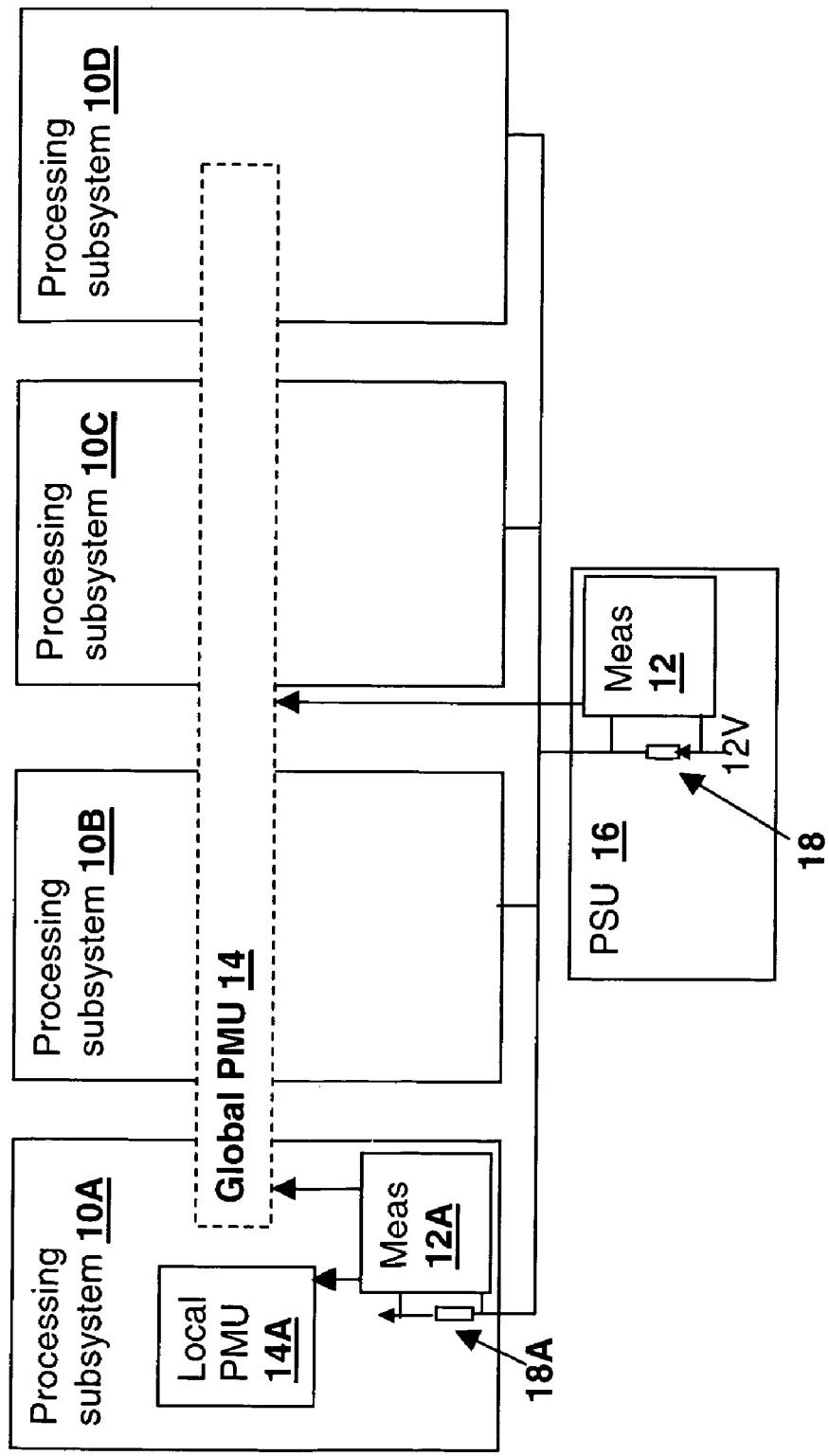
FIG. 1 is a block diagram of a computing system in accordance with an embodiment of the invention.

Referring now to FIG. 1, a processing system is depicted in accordance with an embodiment of the present invention. Processing subsystems 10A-10D illustrate identical subunits of the overall system, and interconnection between processing subsystems 10A-10D is not detailed, nor are connections to peripheral devices. However, it should be understood that such connections and devices generally exist in processing systems and that the techniques of the present invention can be applied to peripheral devices within an processing system as well as electronic systems in general.

A power supply unit (PSU) 16 provides power to processing subsystems 10A-10D and may comprise more than one power supply unit operating in tandem or may supply power to separate partitions of the system. A power measuring unit 12 is shown within PSU 16 as well as other measuring units 12A located within processing subsystem 10A. Sense devices (generally resistors) 18 and 18A provide power measuring units 12 and 12A with a measure of the current consumed either by the system (via sense device 18) or individual subsystems or device (via sense devices 18A). Sense devices 18 and 18A are shown separately to illustrate the high-side power supply connections to the subsystems (the power supply return paths are not shown). Measuring unit 12 will generally not be used if the distributed measuring units 12A are present, but is shown for completeness, as power measurements can be conducted at any level as long as they present a complete picture of either the total system power consumption that must be bounded, or of a local power consumption used to enforce a local bound such as that imposed by the above-incorporated Patent Application. Thus the techniques of the present invention can be used in conjunction with the techniques disclosed in the above-referenced patent applications, providing a mechanism by which local bounding of device power consumption can be enforced and optimized over differing time scales.

Control of power consumption can be effected in a variety of manners. Within this application, reference to a "power-managed device" includes not only devices that change power consumption in response to power management commands, but devices or subsystems that include discrete power control electronics that isolate power supply lines from the devices or subsystems, or power supplies that supply subsystems that are responsive to commands or signals to disable primary output power. Local power management units (PMUs) 14A are illustrated within processing subsystems 10A to show the control path from the measurement units 12A to a destination that can adjust power consumption in response to the measurements of the present invention, and will generally be a processor and program instructions that provide power management in response to information received from measurement units 12A or measurement unit 12. However, in the alternative or in combination, information from measurement units 12A or measurement unit 12 can be sent to a global PMU 14 that controls device power management states from a top-down perspective. Generally, global PMU 14 is either operating system or BIOS program instructions that may be executing on any processor within processing subsystems 10A or another processor coupled to the depicted system. However, hardware implementations of global PMU 14 are contemplated for use within the system of the present invention, for example when a hardware controller controls banks of individual power supplies each for providing power to a subsystem or controls through signaling the power management state of multiple subsystems. In that example, the global PMU 14 signals the individual devices or power supplies to affect power management.

Generally, both global PMU 14 and local PMUs 14A will be used in a system if local control is provided at all, because if all information and power use and control of power management states is contained at a local level, then only local bounding is supported and the total system power supply cannot be used in an optimal manner. For this reason, the present invention provides not only local multiple time-frame power waveforms for power consumption analysis and control, but sends either the waveform information directly or a composite function of the waveform information to global PMU 14. Global PMU 14 might not provide any direct power management control, but can adjust local bounds of each processing subsystem to optimize use of available power from PSU 16. Alternatively, or in concert, Global or local PMUs 14 and 14A may represent operating system or processor control functions such as the scheduler that affect power management control via scheduling more or less threads for a given processor, adjust CPU operating frequency, disable execution blocks within a processor or any other mechanism by which power management within a device or processor is effected. As such, the terminology "adjusting a power management state" should be understood to include the above techniques and should not be construed as limited to a particular power management command structure.

Figure 2:
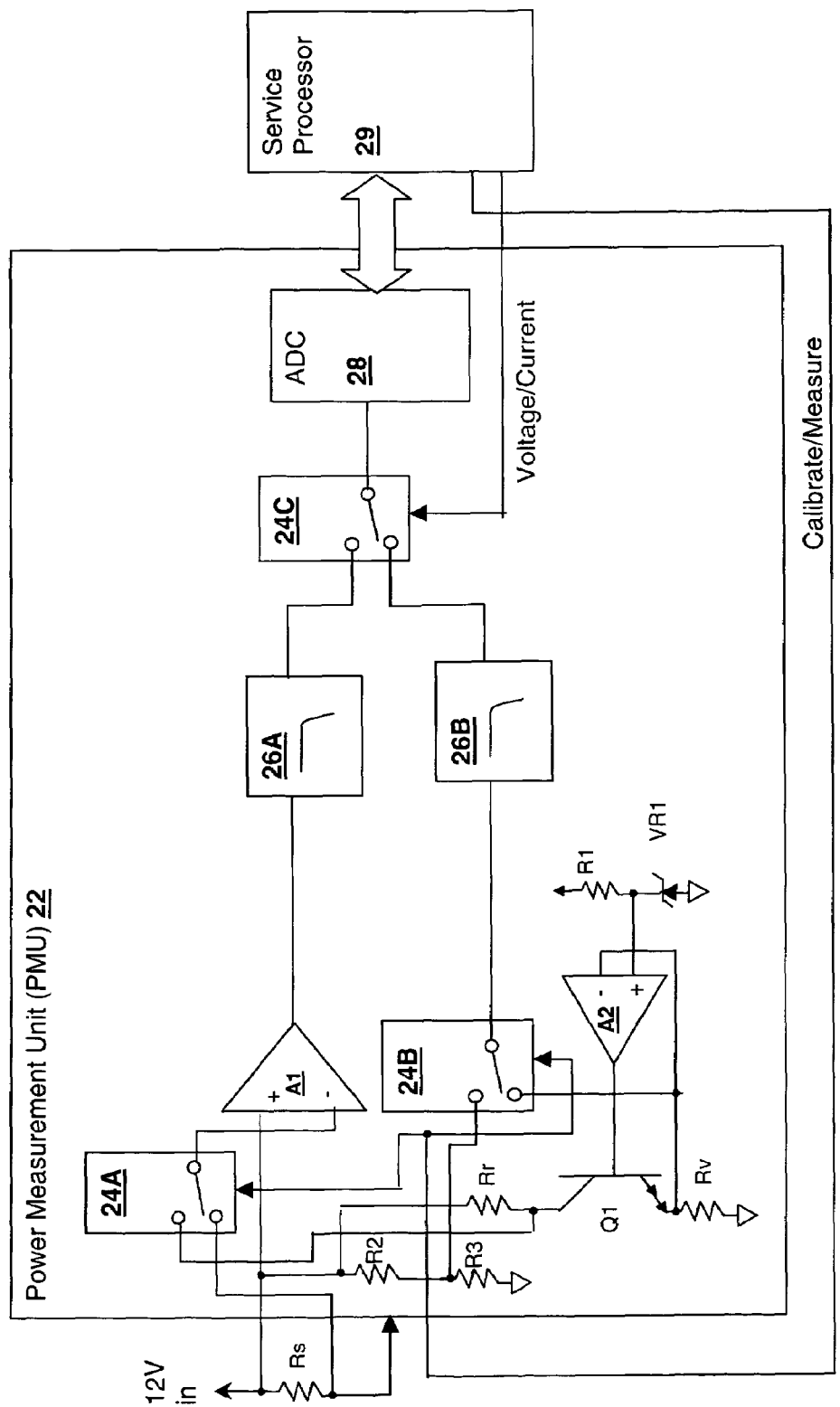
FIG. 2 is a block diagram depicting a power supply measurement circuit in accordance with an embodiment of the present invention, including calibration circuits in accordance with another embodiment of the present invention.

Referring now to FIG. 2, a power measurement circuit in accordance with an embodiment of the invention including calibration circuits in accordance with another embodiment of the invention is shown. A 12V power supply input is received at PMU 22 through sense resistor Rs. The input side of sense resistor Rs is also connected to a differential amplifier A1. A selector 24A selects between the output terminal of sense resistor Rs and the output of a current measurement calibration circuit, so that when a Calibrate/Measure signal supplied by a service processor 29 is in the Calibrate state, the current measuring circuit is calibrated by measuring the voltage drop generated across a reference resistor Rr by a precision current reference formed by transistor Q1 resistor Rv, amplifier A2, zener diode VR1 and resistor R1. The current drawn through resistor Rr forms part of the power consumption of the device in which PMU 22 is located, and therefore should be a small current that does not reduce available power and resistor Rr is scaled so that the voltage drop across Rs and Rr are approximately equal under nominal operating conditions. The calibration of the current measurement circuit at the common-mode voltage of the power supply output (rather than at a particular voltage reference corresponding to the voltage drop across Rs as is typical) provides a calibration value free of non-linearity error at the common-mode voltage of the power supply, which can be substantial when amplifier A1 and selector 24A are operating near their own power supply rails (e.g., when no higher voltage source is available to power the measurement circuits).

A voltage measurement portion of PMU 22 is provided through selector 24B which selects between a divided version of the power supply voltage provided by resistors R2 and R3 when the Calibrate/Measure signal is in the measurement state, and the reference voltage produced across resistor Rv when the Calibrate/Measure signal is in the calibration state. Both the voltage and current calibration or measurement signals are provided to the inputs of corresponding anti-aliasing filters 26B and 26A which removes harmonics from the power supply at greater frequency than the Nyquist rate ($f_s/2$) and either the voltage or the current waveform is selected as input to an analog-to-digital converter (ADC) 28. Service processor 29 then accumulates samples of both current and voltage waveforms, adjusts them by the calibration values obtained during periodic calibration intervals and provides filtering of the current and voltage waveforms according to multiple time-scales. In practice, the filtering algorithm may be an unweighted averaging algorithm or more sophisticated weighted filters and feedback-based digital filtering may be employed. Low pass filters or bandpass filters may be employed for the time-frame filters, although the longest time frame filter will generally-have a low pass characteristic. The use of band-pass filters would provide only relative change information in power consumption rather than absolute power consumption during the corresponding time frame, which complicates computation and is therefore generally not preferred.

The filtered current and voltage waveforms corresponding to each time frame are then multiplied together to determine the actual power consumption of the device or system in each time frame. A set of three filters having time-scales of 1 ms, 60 ms, and 1 sec. has been tested and shown to provide adequate responsiveness to power consumption changes. However, any number of filters and waveforms may be used in accordance with the behavior of the system and the power supplies. Service processor 29 uses the power waveforms computed above to determine whether or not to adjust the power management state of one or more devices in the system. The devices are generally downstream of the power measurement, but this is not a limitation of the invention, as information about power consumption in one partition of the system is relevant to overall power consumption, and thus information about power consumption in one partition may be used to adjust power management levels in another. For example, in a system where the power management is increasing online availability of resources in response to determining that the demand-based power consumption of a particular device is lower than its budget, the system may then increase the resource availability in another device.

In the exemplary embodiment, service processor 29 compares each time-frame power waveform with a maximum and minimum threshold and either performs power management control directly or communicates power management information to another unit, operating system or BIOS in order to effect power management in response to the comparisons. The multiple time-frame comparisons provide the power management scheme with the ability to use short-term higher levels of power than would be possible with a single time frame scheme. The multiple time-frame comparisons also provide a responsiveness that is typically higher than any thermal or normal power measurement so that changing conditions that may result in a failure may be detected quickly and averted.

Figure 3:
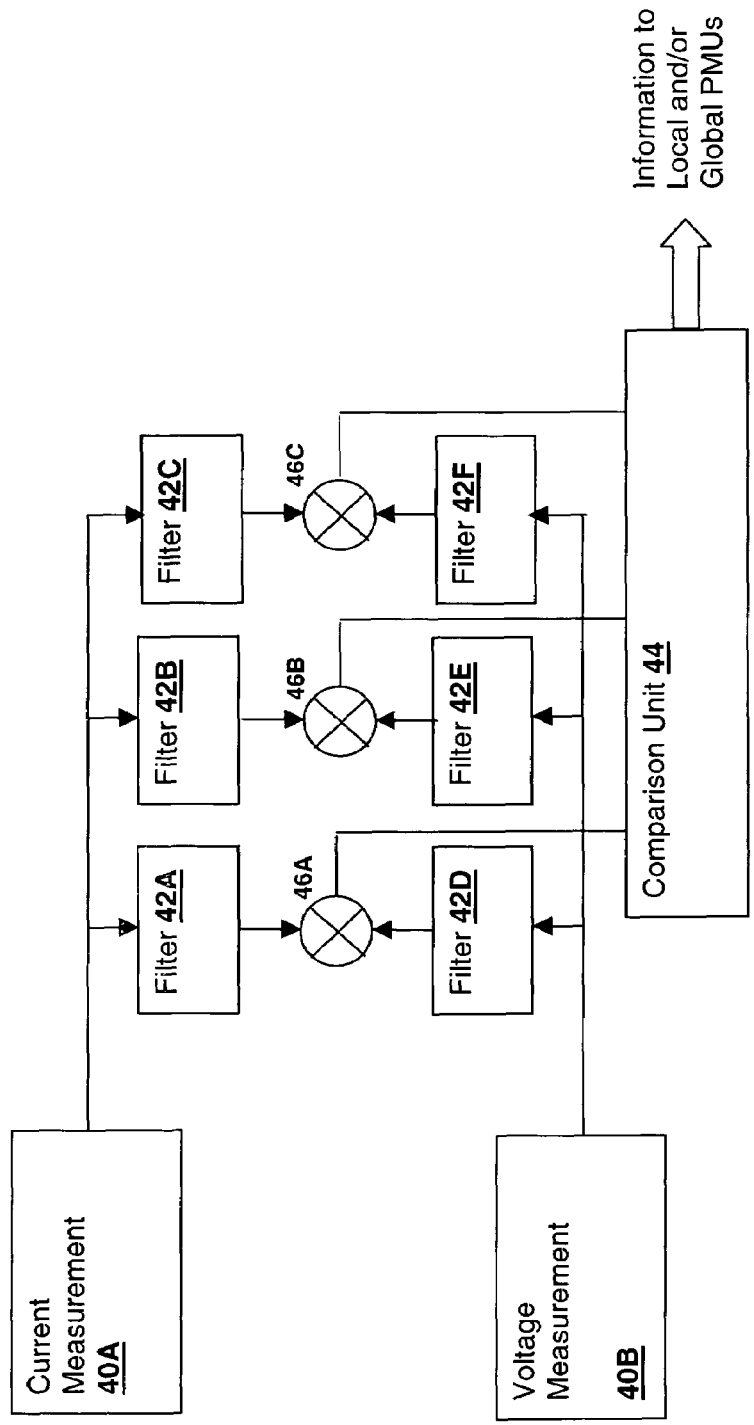
FIG. 3 is a block diagram depicting a power measurement unit in accordance with an embodiment of the present invention.

Referring now to FIG. 3, a power measurement unit in accordance with an embodiment of the invention is illustrated. The illustration provides a functional level description that may be implemented in analog, digital or switched-capacitor hardware, or may be implemented by a processor executing program instructions, such as service processor 29. The outputs of current measurement circuit 40A and voltage measurement circuit 40B are applied to sets of respective filters 42A-C and 42D-F that provide the multiple time-frame waveforms. A set of multipliers 46A-C then multiply the current and voltage waveforms to provide inputs to a comparison unit 44 that compares the time-frame power waveforms to maximum and/or minimum thresholds. Comparison unit 44 supplies information to local and/or global PMUs so that system and/or device power consumption can be adjusted in response to the comparisons.

While the figure provides a concrete example of an architecture that implements the above-described power waveform computation and comparison, the depicted architecture should not be construed as limiting. For example, the filtering may be performed after a single multiplication of the outputs of current measurement circuit 40A and voltage measurement circuit 40B and the comparison unit may provide a more complex treatment of the resulting filtered power waveforms as a functional relationship between the power consumption trend and maximum and/or desired minimum power consumption. Alternatively also, the filter sets 42A-C and 42D-F may be sets of cascaded filters, with the shortest time-frame filter located first in the cascade and so forth.

Figure 4:
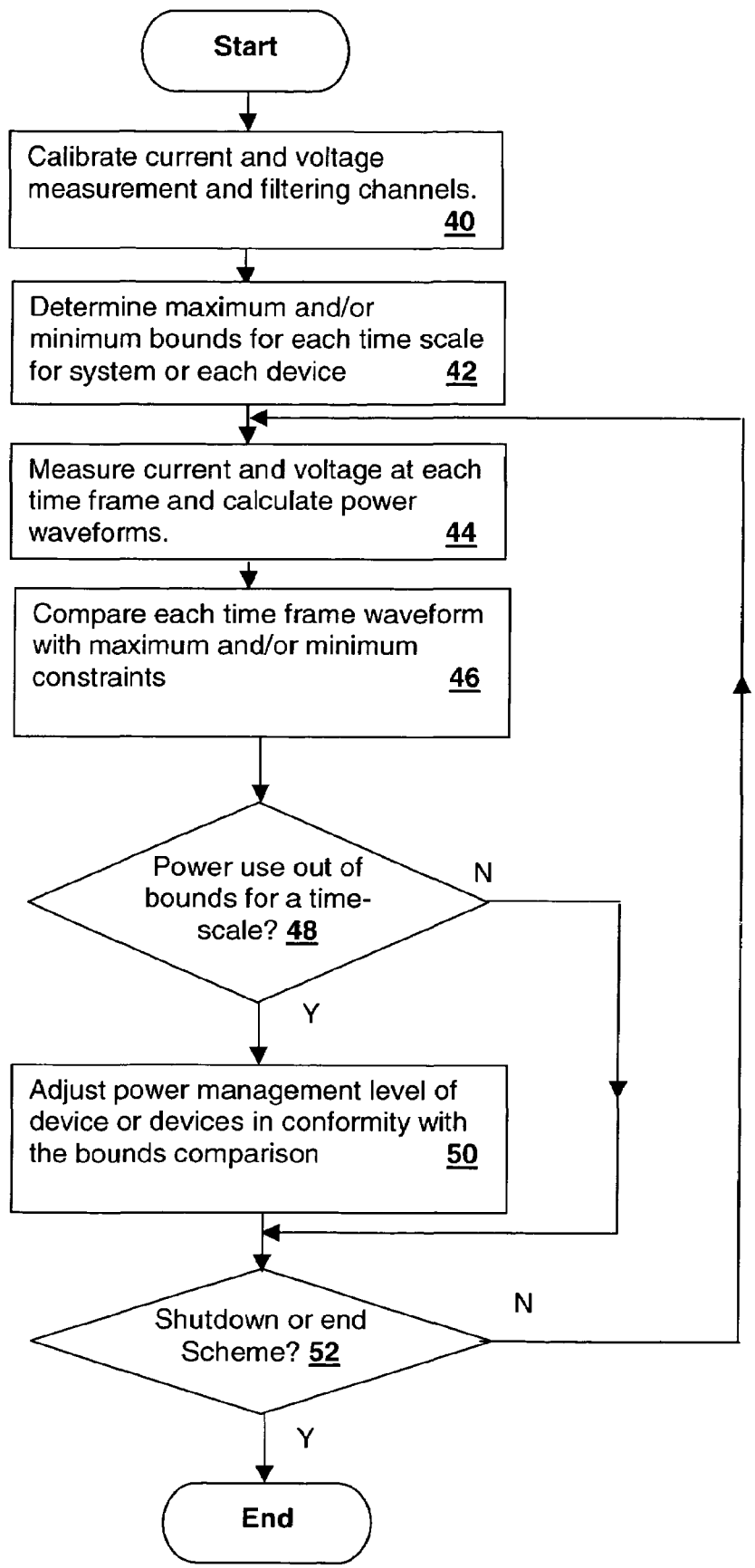
FIG. 4 is a flowchart depicting a method in accordance with an embodiment of the present invention.

Referring now to FIG. 4, a power management method in accordance with an embodiment of the invention is depicted in a flowchart. First, calibration values for current and voltage measurements are taken (step 40) and maximum and/or minimum power consumption bounds for each time scale are determined (step 42). Current and voltage are then measured at each time-frame and power waveforms are calculated (step 44). Each time frame waveform is compared with the minimum and/or maximum constraints (step 46) and then if the power use is out of bound for a particular time scale (decision 48) the power management level of a device or devices is adjusted in conformity with the bounds comparison (step 50). The current and voltage measurement, power computation and comparisons are then repeated until the scheme is ended or the system is shut down (step 52).

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method of managing power in an electronic system, comprising:

measuring a current and a voltage supplied to said at least a portion of electronic system;

computing a power waveform from said current and said voltage and filtering said power waveform to produce multiple time-frame measurements for multiple time-frames of operation of said electronic system, wherein said multiple time-frames are all of differing lengths;

comparing said multiple time-frame measurements with a corresponding pair of predetermined thresholds including a minimum threshold and a maximum threshold for each of said multiple time-frames, to determine whether at least one of said multiple time-frame measurements indicates a need to adjust power consumption within said electronic system; and controlling a power management state of at least one component within said electronic system, wherein in response to said comparing determining that a particular one of said multiple time-frame measurements exceeds said corresponding maximum threshold, said controlling controls said power management state to reduce power consumption for a particular time frame corresponding to said particular one of said multiple time-frame measurements, and wherein in response to said comparing determining that said particular one of said multiple time-frame measurements falls below said corresponding minimum threshold, said controlling controls said power management state to increase power consumption for said particular time frame.

* * * * *